UNITED STATES PATENT OFFICE.

EDWARD GILES STONE AND ERNEST JOSHUA SIDDELEY, OF SYDNEY, NEW SOUTH WALES, AUSTRALIA.

PROCESS OF MOLDING PLASTICS.

1,212,838.      Specification of Letters Patent.      Patented Jan. 16, 1917.

No Drawing. Original application filed March 13, 1913, Serial No. 754,006. Divided and this application filed March 18, 1915. Serial No. 15,315.

*To all whom it may concern:*

Be it known that we, EDWARD GILES STONE and ERNEST JOSHUA SIDDELEY, citizens of the Commonwealth of Australia, residing at Sydney, in the State of New South Wales and Commonwealth of Australia, have invented certain new and useful Improvements in Processes of Molding Plastics, of which the following is a specification.

This is a division of our application Serial No. 754,006, filed March 13th, 1913.

The invention to be described relates to a process or method of molding articles from plastics such as cement, concrete and the like, the main object being to produce a hard, compact molded article from which the moisture is expelled in the molding operation and which shall have an even surface and be of equal consistency throughout. To accomplish these objects we introduce air under pressure into a suitable receptacle or reservoir containing a supply of the plastic material to be molded. From this reservoir we feed the material into a suitable mold, the latter being provided with a plurality of small outlets distributed evenly over the mold to allow equal escape of air and moisture from the plastic material. Simultaneously we tap the core of the mold at numerous points by means of any suitable mechanism, or if desired other parts of the mold might be tapped, the object of the tapping being to jar loose any mass of plastic material and to aid in packing the plastic material and expelling the moisture therefrom. It is sometimes found desirable to supply air under pressure to the mold simultaneously with feeding the material thereto, thus further aiding in expelling the moisture. There will be no air pressure in the mold itself unless the supply of air should exceed the aggregate outflow through the various openings; but the pressure on the air supplied to the mold will insure a good flow of air through the latter and consequent thorough evaporation and removal of moisture. This process insures solid packing of the material, therefore an even surface and equal consistency of the material in the object molded, the air pressure contributing mostly to this result and the expulsion of water caused thereby greatly expediting the drying the article. Where compressed air is introduced directly into the mold too it of course greatly increases the expulsion of surplus moisture.

The process or method above described is quite simple and easily understood and may be performed by any suitable mechanism and it therefore is not thought necessary nor desirable to illustrate any particular mechanism or mode of operation.

Having thus described our invention, what we claim as new and desire to obtain by Letters Patent is:—

1. A process for molding plastics comprising, supplying air under pressure to an air tight reservoir containing the material to be molded and, next, feeding this material to a suitable mold while under such pressure, allowing the simultaneous escape of air and moisture freely through perforations in all parts of said mold.

2. A process for molding plastics, consisting of the following steps, first, supplying air under pressure to an air tight receptacle or reservoir containing the material to be molded, second, feeding this material to a suitable mold while simultaneously supplying air under pressure directly to said mold and allowing the escape of air and moisture through holes to all parts of said mold.

3. A process for molding plastics consisting in feeding plastic material to a mold from which air and moisture are free to escape at all points and jarring said mold to prevent adhesion of such material.

In testimony whereof, we have signed our names to this specification in the presence of two subscribing witnesses.

EDWARD GILES STONE.
ERNEST JOSHUA SIDDELEY.

Witnesses:
  JOHN JASPER STONE,
  MARY LARKIN.